April 13, 1965   G. A. KENDALL   3,178,037
DRAFT GEAR COUPLING DEVICE
Filed July 16, 1962   5 Sheets-Sheet 1

INVENTOR.
GILES A. KENDALL
BY R. E. Geaugue
ATTORNEY

April 13, 1965  G. A. KENDALL  3,178,037

DRAFT GEAR COUPLING DEVICE

Filed July 16, 1962  5 Sheets-Sheet 2

INVENTOR.
GILES A. KENDALL

BY
ATTORNEY

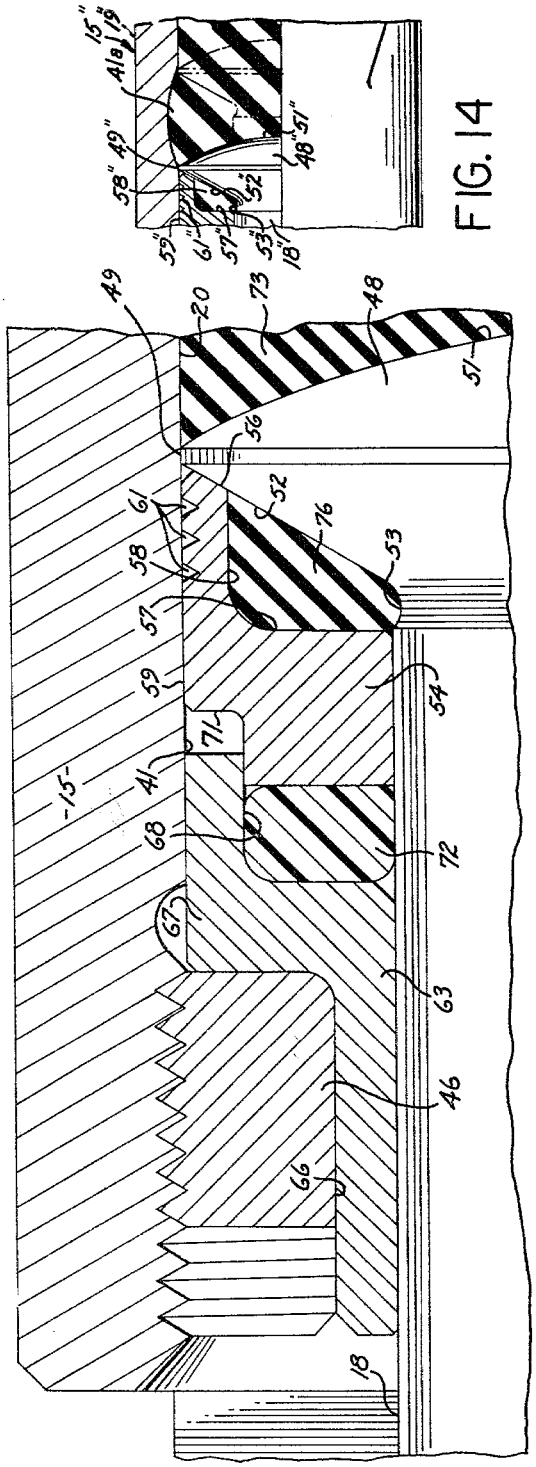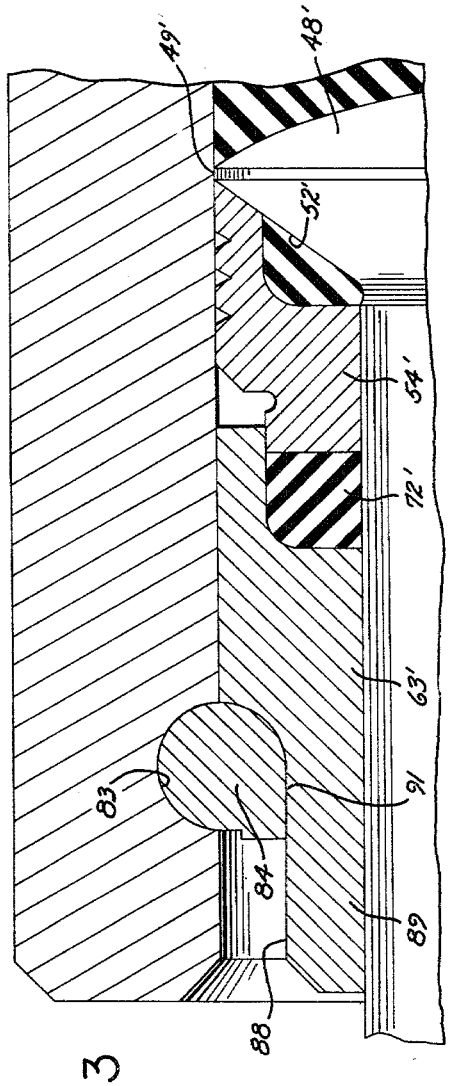

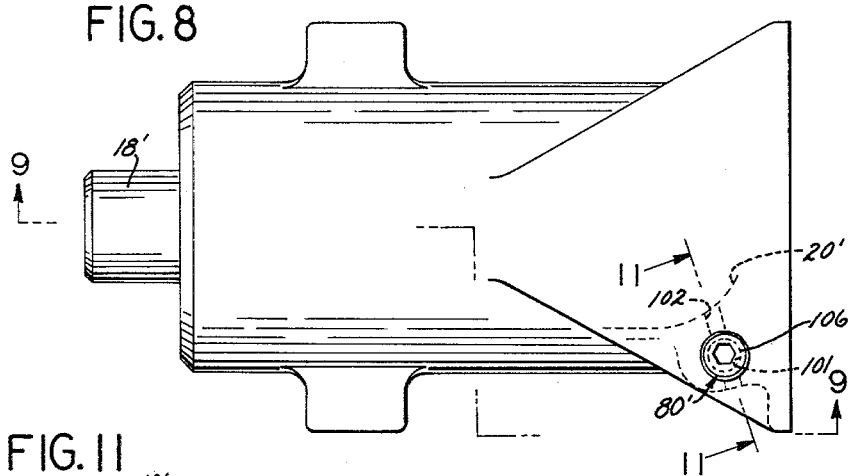
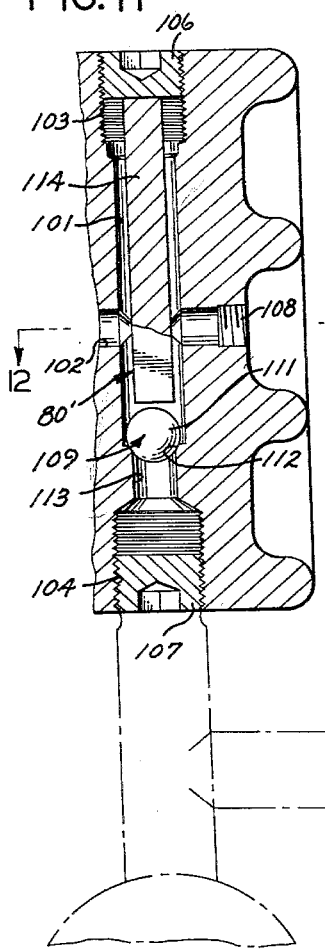
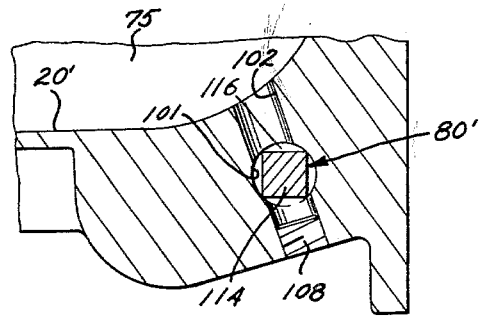

INVENTOR.
GILES A. KENDALL
BY R. E. Geauque
ATTORNEY

United States Patent Office 3,178,037
Patented Apr. 13, 1965

3,178,037
DRAFT GEAR COUPLING DEVICE
Giles A. Kendall, Van Nuys, Calif., assignor to Menasco Manufacturing Company, Burbank, Calif., a corporation of California
Filed July 16, 1962, Ser. No. 210,159
9 Claims. (Cl. 213—40)

This invention relates to a Draft Gear Coupling Device and more particularly to an improved means for cushioning the impact of draft and buff forces imparted to coupling means coupling adjacent cars of a railway vehicle.

More specifically, this invention provides a new and improved railway draft gear employing Dampers and Damped Springs more fully disclosed in my copending application of such title, Serial No. 784,384, filed December 31, 1958, in which a compressible solid is utilized as the working medium for obtaining damping action and damped spring action.

As described in the above-identified pending application, although liquids and other spring devices are used as the damping medium in various types of dampers, the use of a compressible solid as the damping and spring medium provides certain structural advantages over the use of liquid in that the compressible solid does not present the leakage problem frequently encountered with liquids. Also, a compressible solid produces a static damping and a spring force which must be overcome by external force before movement can result relative to the solid medium. Further, by use of an orifice in the damping device, it is possible to obtain exponential velocity damping resulting from acceleration of the compressible solid through the orifice.

It is therefore an object of the present invention to provide a new and improved means for producing a damping force or a damped spring force to absorb buff and draft forces directed against detachable coupling means coupling a pair of adjacent cars of a railway vehicle by utilizing a confined compressible solid as the working medium.

Another object of this invention is to provide a new and improved damper or damp spring utilizing a compressible solid as the working medium in which sealing is required only to prevent extrusion of the solid.

A further object of this invention is to provide a new and improved railway draft gear utilizing a compressible solid as the working medium for absorbing kinetic energy of a coupling for a railway vehicle which requires a finite force to initiate relative movement of the components of the device.

Yet another object of this invention is to provide new and improved means for charging a cylinder with a predetermined damping force and means for adjusting the initial pressure of the working medium charging the cylinder.

A general object of this invention is to provide a new and improved railway draft gear which overcomes disadvantages of prior means and methods heretofore intended to accomplish generally similar purposes.

These and other objects of this invention will be more apparent from the following drawings, detailed description and appended claims.

In the drawings:

FIGURE 6 is a fragmentary, enlarged, vertical, cross-sectional view illustrating more particularly a portion of the cushioning means of FIGURE 5 in greater detail;

FIGURE 8 is a side view, in elevation, of a modified embodiment of this invention;

FIGURE 11 is an enlarged, vertical, cross-sectional view as taken substantially along the line 11—11 of FIGURE 8;

FIGURE 12 is a fragmentary, horizontal, cross-sectional view as taken substantially along the line 12—12 of FIGURE 11;

FIGURE 13 is an enlarged, fragmentary, vertical, cross-sectional view illustrating a portion of FIGURE 9 in greater detail; and FIGURE 14 is a fragmentary cross-sectional view similar to FIGURE 5, illustrating another modification of this invention.

Figure 1:
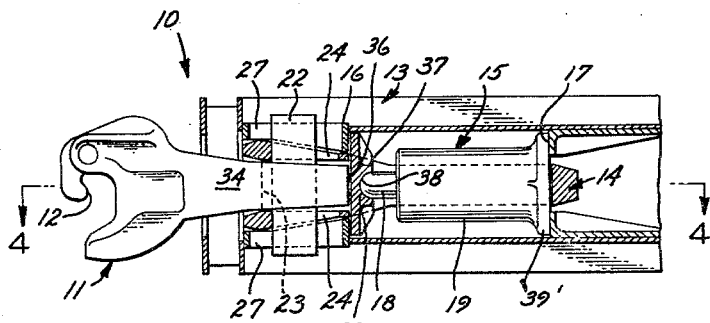
FIGURE 1 is a longitudinal, cross-sectional view as taken substantially along the longitudinal centerline of the railway draft gear of this invention, with parts shown in plan.

Referring in detail to the drawings, there is shown by way of illustration, but not of limitation, a railway draft gear for coupling cars of a railway vehicle and cushioning the impact of draft and buff forces therebetween, designed and constructed in accordance with this invention and generally designated by the numeral 10. The railway draft gear 10 generally comprises a movable coupling member 11 adapted to be secured to one car of the railway vehicle for detachably coupling the car to another car thereof, the coupling member 11 having a hook 12 for detachable engagement with a complementary hook member (not shown) of the other car.

The railway draft gear 10 is supported by a frame or car sill, generally designated by the numeral 13, on which the coupling member 11 is movably mounted for transmitting buff and draft forces to a yoke member 14 which, in turn, is coactive with a cushioning means 15 for cushioning the impact of draft and buff forces. The frame 13 includes a pair of spaced fixed stops 16 and 17 which are coactive with the cushioning means 15, in response to movement of the coupling member 11, for translating buff and draft forces applied to the coupling member 11 to move a plunger 18 of the cushioning means 15 inwardly relative to a cylindrical housing 19 thereof defining an inner, closed chamber generally designated by the numeral 20.

Movement of the coupling member 11 is translated into a movement of the yoke member 14 by a lost motion connection 21 comprising a transverse key 22 extending through an aligned transverse slot 23 of the coupling member 11 and opposed elongated slots 24 of opposed legs 26 of the yoke means 14. The key member 22 is further laterally guided by aligned slots 27 in the frame member 13 adjacent to the stop 16. The key 22 is capable of a slight longitudinal movement relative to the coupling member 11 in the slot 23 and has a relatively long movement relative to the elongated slots 24 of the yoke member 14.

Figure 2:
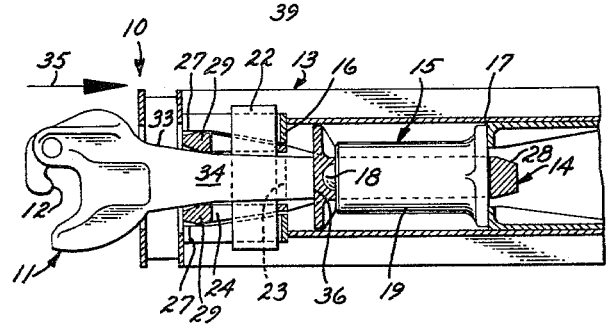
FIGURE 2 is a cross-sectional view, similar to FIGURE 1, illustrating the component parts of FIGURE 2 in one actuated position as when a buff force is directed thereagainst.
Figure 3:
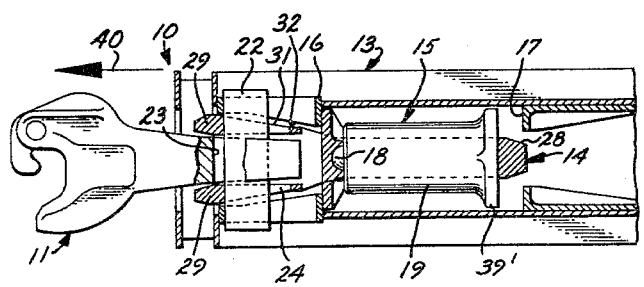
FIGURE 3 is a cross-sectional view similar to FIGURES 1 and 2, illustrating the railway draft gear of this invention in another actuated position as with a draft force directed thereagainst.
Figure 4:
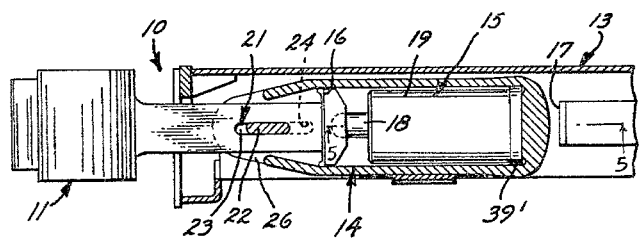
FIGURE 4 is a cross-sectional view as taken substantially along the line 4—4 of FIGURE 1.

The forward end of the yoke 14, opposed to a bight portion 28 further includes a pair of transverse wedge members 29 formed integrally therewith or secured thereto and having outer sloped faces 31 coactive with inner sloped faces 32 of the frame member 13 for limiting movement of the yoke member 14 in one direction, to the right as viewed in FIGURES 1–3, inclusive. The yoke member 14 has outwardly tapered edges 33 on its shank portion 34 so as to engage the wedge members 29 when moved inwardly relative to the frame 13.

Therefore, in accordance with the above description, buff and draft forces received by the coupling 11 are transmitted to the plunger 18 to move the plunger 18 inwardly relative to the chamber 20 of the cylinder 19 in the following manner. When a buff force is directed against the coupling member 11, as indicated by the arrowed line 35 in FIGURE 2, the coupling 11 moves relative to the key 22 until the forward edge of the slot 23 picks up the key 22, which, in turn, moves relative to the slot 24 a distance sufficient for the tapered edges 33 to contact the inner surfaces of the wedge member 29 whereupon the movement is transferred to the wedge members 29 and thereby to the yoke member 14 to move the yoke therewith. The coupling 11 is thus free to move inwardly relative to the frame 13 so that its inner end 36 abuts a pad 37 which includes a spherical depression 38 contacting the outer spherical end 39 of the plunger 18 to transmit the force to the pad 37 and then to the plunger 18. Initially, this contacting force is transmitted to the entire cushioning means 15. However, inasmuch as an enlarged flange 39' is normally biased, by means to be hereinafter described, into contact with the stop 17, the cylinder 19 cannot move, resulting in an inward movement of the plunger 18 relative to the cylinder 19 so as to move inwardly relative to the chamber 20 defined by the cylinder 19.

Conversely, as best viewed in FIGURE 3, when a draft force, one indicated by the arrowed line 40 in FIGURE 3, tending to pull the coupling 11 so as to pull the car on which the frame 13 is secured, the coupling 11 is pulled in the direction of the arrowed line 40 to move in an opposite direction in the slot 23 to engage the slot 23 with the key 22 to transmit the force into the key 22. The key 22, in turn, moves relative to the slot 24 until it contacts a forward edge of the slot to transmit the force to the wedge members 29 of the yoke member 14 and thereby cause the yoke member 14 to also move in the direction of the arrowed line 40. In response to the movement of the yoke 14, the bight portion 28 of the yoke contacts the outer, flanged end of the cylinder 19 to cause the cylinder 19 to move in the direction of the arrowed line 40. The plunger 18, having its pad 37 normally biased into abutment with the stop 16 and thereby, being immobilized, is thereby extended inwardly relative to the chamber 20 of the cylinder 19. In this manner, in response to either the buff force 35 or the draft force 40, the plunger 18 moves inwardly relative to the chamber 20 of the cylinder 19. Although the arrowed line 35 indicates a buff force and the arrowed line 40 the draft force for the purpose of more clearly describing the invention, it is to be recognized that the converse may be true if the railway vehicle travel is reversed, i.e., wherein the arrowed line 35 can indicate a draft force and the arrowed line 40, the buff force.

Figure 5:
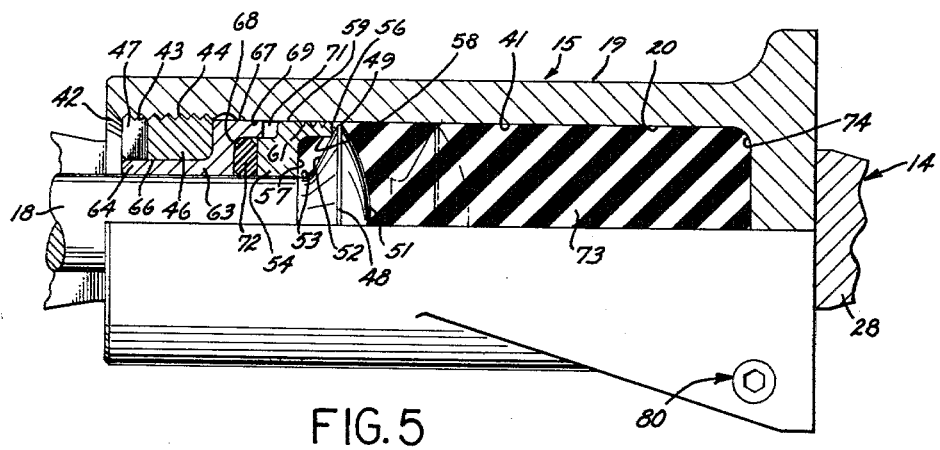
FIGURE 5 is an enlarged, vertical, cross-sectional view as taken substantially along the line 5—5 of FIGURE 4 and illustrating more particularly the cushioning means thereof in greater detail.

As best viewed in FIGURE 5, the cushioning means 15 includes means responsive to the movement of the plunger 18 for absorbing the kinetic energy of the buff and draft loads transmitted to the plunger 18. The chamber 20 of the cylinder 19 is defined by a longitudinal blind bore 41 terminating in internal threads 43, at an open end 42, the threads 43 being engageable by external threads 44 of an annular nut 46. The nut 46 is preferably provided with tool engaging means, such as radial slots 47 engageable as by a spanner wrench (not shown), for manipulation thereof for adjusting its axial position relative to the chamber 20 for a purpose to be hereinafter described. The nut 46 acts as a closure member for the chamber 20, with the plunger 18 extending therethrough.

The plunger 18 includes an enlarged head 48 on its inner end extending into the chamber 20. The head 48 is dimensioned so as to provide an annular orifice 49 between its outer surface and the bore 41 for a purpose to be hereinafter described. The head 48 further includes a spherical surface 51 on its inner face and a frusto-conical surface 52 connecting the head 48 with the plunger 18, there being preferably an annular groove 53 at the junction of the frusto-conical portion 52 and the plunger 18.

The seat member 54 includes a frusto-conical annular surface 56 cooperable with the conical surface 52 for seating of the head 48 on the seat 54 and a bore 57 defining an annular chamber 58 around the head 48 when the head is seated against the surface 56 and an annular effective pressure area substantially smaller than that of chamber 20. The seat member 54 includes an outer peripheral surface 59 slidable within the bore 41 and having a sealing labyrinth formed thereon comprising a plurality of axially spaced annular grooves 61 for statically sealing the seat member 54 relative to the bore 41 for a purpose to be hereinafter described.

An adapter 63 is provided having a reduced end 64 slidable within a bore 66 of the nut member 46. The adapter member 63 further includes an enlarged end 67 slidable within the bore 41 and having an annular portion receivable within an annular notch or groove 71 of the seat member 54 so as to be movable relative thereto. A counterbore 68 in the enlarged portion of the adapter 63 forms an annular chamber between the enlarged portion of the adapter 63 and the plunger 18 in which a dynamic seal 72 is disposed for sealing the seat member 54 relative to the plunger 18. The seal member 72 is preferably formed of a compressible, resilient material such as asbestos-Teflon composition, or the equivalent.

The chamber 20 of the cylinder 19 contains a compressible solid, generally indicated by the numeral 73. The compressible solid acts as a solid spring and completely fills the chamber 20 between the head 48 and end wall 74. The annular chamber 58 is likewise filled by a portion 76 of the compressible solid 73 which extends or flows through the orifice 49 into the chamber 58 when the chamber 20 is initially charged with the compressible solid 73 to a predetermined load pressure, indicated in the graph of FIGURE 7 as being approximately 70,000 pounds.

Various compressible solids can be utilized in the chamber 20, such as silicone rubbers (Silastics), or other silicone base solids, natural or synthetic rubber compounds, metallic sodium, potassium, cesium, or lithium, as described in said co-pending application referred to above. The silicone rubbers are produced from dimethyl, polysiloxanes in which various vulcanizing agents are incorporated to obtain various degrees of hardness and thereby various degrees of shear strength. The mark "Silastic" is the trade name for the silicone rubbers produced by Dow Corning, these rubber products being available in a wide range of unit shear strength and compressibility.

For the purpose of the present invention, a solid is defined to be such materials as do not change dimensionally under a 1G stress loading. A compressible solid can be defined as a material which demonstrates significant reduction in volume when subjected to pressure. This reduction is an elastic phenomena caused by the reduction of the spacing between molecules of the material. When the pressure is removed from such a material, the spacing is restored to its original condition by intermolecular elastic forces. Of course, any solid to be compressible must be able to accomplish a change in volume and every substance is compressible to some extent. In addition, it is understood that all solids will flow plastically when subjected to a high enough pressure. As referred to herein, plastic flow of a compressible solid means the flow which results when the solid is subjected to a high enough pressure to produce a permanent change in relationship of the molecules, similar to the change which results in a fluid passing through an orifice. For example, sufficient pressure can be developed locally in a solid at a location adjacent to an orifice to cause the solid to flow plastically through the orifice, with the resulting permanent change in relationship of the molecules during the plastic flow. The compressible solid utilized in the present invention exhibits both plastic flow and compressibility as defined above. For any given pressure, the volume of the compressible solid remain constant irrespective of plastic flow of the material during damping which produces a reorientation orientation of the individual molecules. Also, the inherent relationship between pressure and volume of a compressible solid provides the spring force which returns the plunger to the extended condition.

In the instant invention, the plunger 18 having the enlarged head 48 forms the annular orifice space 49 with the side walls of the cylinder 19. With the addition of the head 48 to the plunger 18, damping forces, in addition to frictional velocity damping forces on the plunger portion 18 adjacent to the compressible solid 76, are accomplished. Movement of the head 48 requires that the compressible solid 73 must flow through the orifice 49 and such flow requires acceleration and shearing of the solid material so that exponential and viscous velocity damping results. The force required to produce the plastic flow of the solid through the orifice is felt by the head 48 and is equal to the forces required to accelerate and shear the material.

As is apparent, this damping force is similar to the exponential and viscous velocity damping which would result from the movement of the head through a liquid. Another damping characteristic also results from movement from the head 48 in that a part of the solid 73 which is accelerated and sheared through the orifice 49 will shear relative to the surface of the head 48 to provide an additional shear damping force. In addition, shear damping results along the surface 51 of the head 48.

The grooves 61 of the labyrinth provide means for sealing the compressible solid 73 relative to the chamber 20 so as to prevent extrusion of the compressible solid between the peripheral surface 59 and the bore 41. In practice, it has been found that although a portion of the compressible solid 73 may be extruded as far as the centermost annular groove 61, the extrusion of the material 73 will not extend further than the outermost annular groove 61. Therefore, three such grooves 61, as illustrated herein, are preferably provided in axially spaced relationship along the peripheral surface 59.

In accordance with this invention, the cushioning means 15 provides means for producing a damping force or a damped spring force to absorb buff and draft forces directed against the plunger 18 which moves the plunger 18 axially relative to the cylinder 19. The forces are absorbed by the damping and spring action of the compressible solid 73 within the chamber 20. When a draft force (40) is applied to the yoke 14, the cylinder 19 is moved to the left, as illustrated in the FIGURES 2 and 3, causing the plunger 18 to move inwardly of the chamber 20 with the draft force being absorbed by the damping effect of the compressible solid 73. The head 48 of the plunger 18 is unseated from the conical seat 56 whereby the compressible solid 73 is caused to flow through the orifice 49 from the right side of the piston head 48 to the left side and into the chamber 58.

It is to be understood that the cross-sectional configuration of the cylinder 19 can be varied to provide a cylinder profile or shape which cooperates with the piston head to provide a variable orifice or extrusion gap for the material as the piston moves within the cylinder. Such a variable extrusion gap provides a variable damping force as a function of stroke, and this relationship will be determined by the operational conditions in which the device is utilized. For example, referring to FIGURE 14, in which parts identical to parts of the first embodiment are indicated by like numbers which are double primed, the contour line 41a designates an internal bore surface which is contoured by enlargement and could be used instead of the straight longitudinal bore 41.

Figure 7:
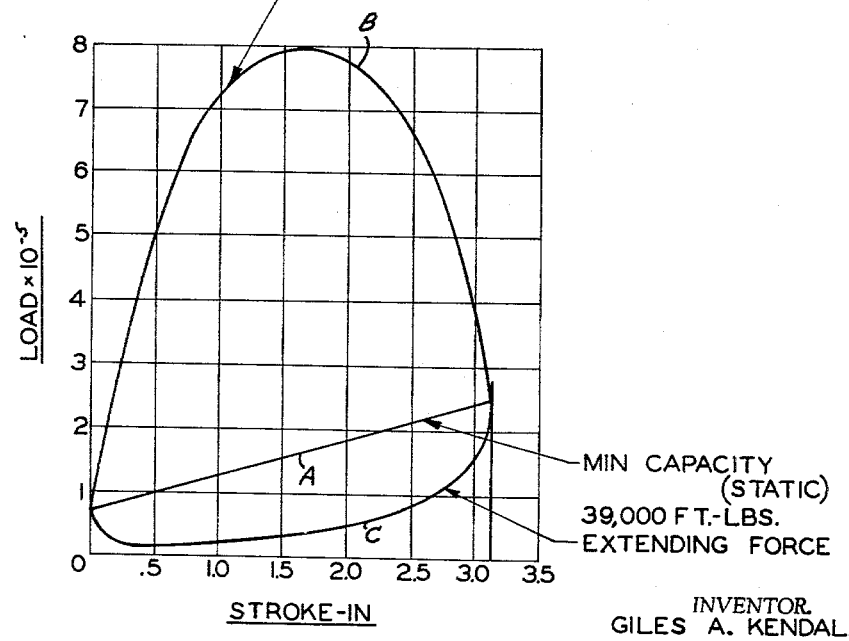
FIGURE 7 is a graph showing characteristic curves denoting the effect of typical cushioning functions of the draft gear of this invention.

It will be noted particularly that the effective annular area of the sealing member 72 is substantially smaller than the annular effective area of the chamber 20 so that the annular sealing member 72 is constantly under a higher pressure than that of the compressible solid 73 and is thus sufficient to seal the seat member 54 relative to the plunger 18 and prevent extrusion of compressible solid material therethrough. As best seen in the graph of FIGURE 7, the curve A of the graph designates the forces of resistance generated by the unit during a low velocity stroking of the piston relative to the cylinder. It will be noted that the curve A slopes upwardly from a preloaded force of approximately 75,000 pounds preload to its peak of approximately 250,000 pounds. The curve A therefore designates a typical draft or buff force applied to the coupling under normal operation of the unit and applied to the unit when one car is pulling or pushing another car coupled thereto. However, when an impact force is applied, which occurs, for example, when one car is being coupled to another, a substantially greater load is applied to the unit which is designated by the curve B in the graph of FIGURE 7. The amplitude of this curve is a function of coupling velocity. Curve C illustrates the extending force available from the unit during the extension cycle wherein the compressible solid 73 acts as a spring to return the plunger 18 towards the seat 56. The annular sealing member 72 is constantly under increased pressure due to the differential of the unbalanced effective areas provided in the unit, as mentioned above. The annular effective area biasing the seat member 56 and defined by the differential between the area of the bore 41 and the outer diameter of the plunger 18 is constantly larger than the area of the sealing member 72 which is defined by the differential area of the bore 68 and the outer diameter of the plunger 18.

When a buff force is applied to the plunger 18, as when the movement of the cars is initiated in a reverse direction, the plunger 18 moves inwardly relative to the cylinder 19, such buff forces being applied through the coupling member 11 while the motion of the cylinder 19 causes the compressible solid 73 to flow through the orifice 49 and resist or dampen the movement of the head 48 in the manner similar to that produced by the draft force. In this manner, both the draft and buff forces are dampened by the compressible solid 73 which flows back and forth between the chambers 20 and 58, the compressible solid being compressed in response to the inward movement of the piston relative to the chamber in one direction and acting as a spring in the other direction.

The chamber 20 may be charged with the compressible solid 73 by initially charging the chamber 20 with the compressible solid, after which the plunger, seat member 54, sealing member 72 and the adapter 64 may be preassembled and held to be extended within the chamber 20 by holding means (not shown). Subsequently, the nut 46 may be threaded relative to the internal threads 43 of the cylinder 19 while the assembly is held in the chamber 20 by the holding means. After the threads 44 are initially engaged with threads 43, the holding means may be removed and the nut 46 threaded inwardly of the cylinder 19 to adjust the initial pressure of the compressible solid 73. In this manner, the initial pressure of the compressible solid 73 may be adjusted to increase or decrease the initial pressure.

An alternate means for charging the cylinder with the compressible solid and for adjusting the initial pressure of the compressible solid is indicated generally by the numeral 80 in the first embodiment of FIGURES 1-7, inclusive, and described in greater detail in connection with the second embodiment of FIGURES 8-12, inclusive. The means 80 is substantially identical in both embodiments and shown in greater detail in the second embodiment; therefore, adjustment and loading means common to both embodiments shall be described in greater detail in connection with the second embodiment.

Referring more particularly to the second embodiment of this invention, parts identical to like parts of the first embodiment are designated by like numbers which are primed. The cushioning means 15' generally operates in the same manner as the cushioning means 15 of the first embodiment, wherein a cylinder 19' defines a chamber 20' having a plunger 18' reciprocable therein wherein a compressible solid 73' is adapted to dampen buff and draft forces applied to the cushioning means by flow of the solid through the orifice 49'. Although the cushioning means 15' is illustrated with the omission of the coupling member 11, it is to be understood that draft and buff forces are transmitted to the cushioning means 15' in a manner similar to that of the cushioning means 15 of the first embodiment and in which a draft force is applied to the end 81 of the cylinder 19' to move the cylinder in one direction, as designated by the arrowed line 40', while the plunger 18 is held stationary and draft forces are directed against the plunger 18', as designated by the arrowed line 35', to move the plunger 18' inwardly of the chamber 20' while the cylinder 19' is held stationary. The forces generated by the buff and draft forces are cushioned by the compressible solid 73' within the chamber 20'.

Movement of the coupling member, such as coupling member 11, may be translated into a movement of a yoke member like the yoke member 14 of the first embodiment (by a lost motion connection similar to the connection of the first embodiment) to transmit the draft force 40' to the end 81 of the cylinder 19'. Buff forces, indicated by the arrowed line 35', may be translated into a linear movement of the plunger 18' inwardly of the chamber 20' in a key-slot arrangement 22-24, similar to the arrangement of the first embodiment, to move the plunger 18' in a direction to the right, as viewed in the drawings.

The cushioning means 15' includes the charging and adjusting means 80' whereby the chamber 20' may be charged with a compressible solid 73' to a predetermined initial pressure, so as to predetermine the damping force applied to the plunger 18' and its head 48' relative to the chamber 20'. In the instant embodiment, the plunger 18' has an enlarged head 48' having a frusto-conical surface 52' seatable on a seat member 54', an adapter member 63' and an annular sealing member 72', in sealing engagement between the adapter 63 and the plunger 18' due to the differential of defective areas as described in connection with the first embodiment.

Figure 10:
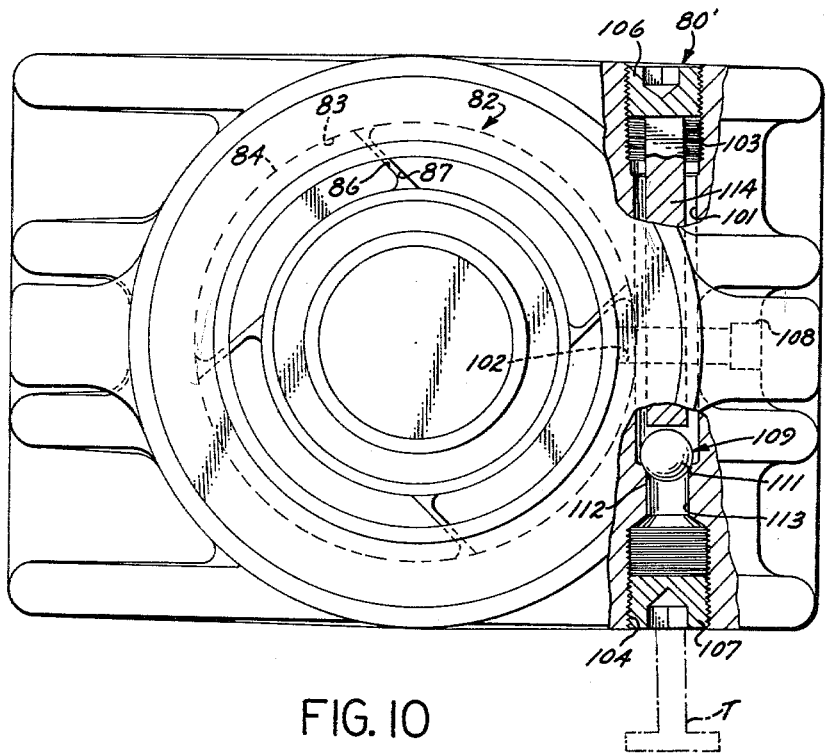
FIGURE 10 is an enlarged, end view as viewed substantially along the line 10—10 of FIGURE 9 with parts broken away for greater clarity.

In the instant embodiment, the adjustment means is incorporated with the charging means 80' and the seat 54' is held against axial movement to the left by a split-ring member generally designated by the numeral 82 and seated in an annular groove 83 adjacent to the open end 42' of the cylinder 19'. As best seen in FIGURES 10 and 13, the split-ring 82 comprises a plurality, four herein shown, of arcuate segments 84 having complementary bevelled adjacent ends 86 and 87. The segments 84 are held in annular arrangement by the outer diameter 88 of the reduced portion 89 of the adapter 63' and the segments 84 are assembled after the plunger 18', seat member 54', annular sealing ring 72', and adapter 63' are installed to surround the plunger 18' extending within the chamber 20' prior to loading the chamber 20' with the compressible solid 73' which is preferably charged in a manner to be hereinafter described.

Figure 9:
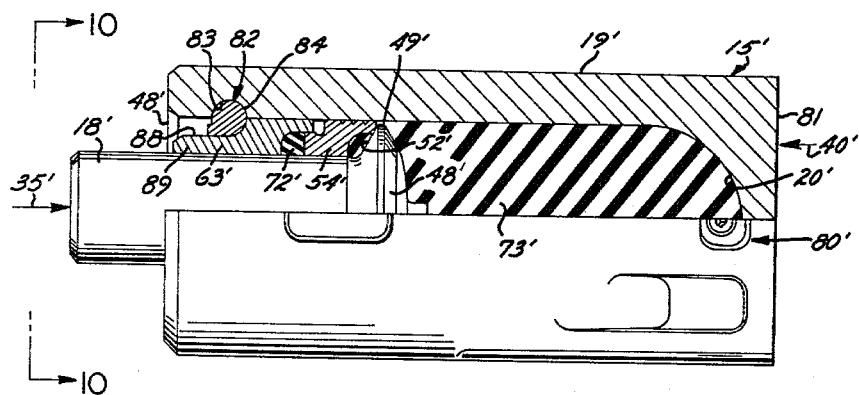
FIGURE 9 is a vertical, partial cross-sectional view as taken substantially along the line 9—9 of FIGURE 8.

As best seen in FIGURES 9, 10 and 13, each segment 84 includes a substantially cylindrical configuration, in transverse cross-section, having a relatively flat surface 91 tangent thereto and cooperative with the outer diameter 88 of the reduced portion 89 of the adapter 63' to be slidable thereon. When assembled, the cylindrical outer portions fit in the annular groove 83 of complementary configuration whereas the faces 91 form a continuous cylindrical internal surface slidable on the reduced portion 89.

The loading and adjusting means 80' includes or comprises a transverse bore 101 extending through the body of the cylinder, preferably adjacent to the end 81, and having a lateral bore 102 intermediate thereof and bisecting the bore 101 to communicate the bore with the interior of chamber 20'. The bore 101 is enlarged at its opposite ends 103 and 104 which are internally threaded for receiving plugs 106 and 107, respectively, for selectively closing the bore. The bore 102 may be practicably formed by drilling through the wall of the cylinder 19' from the exterior of the body so as to intersect the bore 101 and communicate the bore 101 with the chamber 20'. The transverse bore 102 is closed at its outer end by a threaded plug 108, or the like. A valve member 109 comprises a spherical element 111 seated on an annular seat 112 of a reduced portion 113 of the bore 101, and a limiting rod in the bore 101 for limiting an unseating movement of the spherical element 111 when the chamber 20' is being charged.

To charge the cylinder 20' with a compressible solid, similar to the compressible solid designated for the material 73 of the first embodiment, pumping means, indicated generally by the broken lines P of FIGURE 11, and supplied with an outlet nipple having external threads threadable in the enlarged portion 104 of the bore 101 may be attached to the threaded portion 104 by removal of the plug 107. In response to the pumping action of the pump P, the compressible solid is pumped into the bore 101 to unseat the spherical element 111 and flow through the bores 101 and 102 into the chamber 20'. When a predetermined charge of the compressible solid 73' in the chamber 20' is achieved, the pump may be deactuated, whereupon the compressible solid exerts a force against the spherical element 111 to seat the element on the annular seat 112 to close the bore 101.

The limiting rod 114 is preferably square in cross-sectional configuration, so as to provide a passage 116 around the rod for flow of the compressible solid into the chamber 20'. To adjust the pressure of the compressible solid to a lesser pressure, the plug 107 may be removed and the spherical element 111 unseated to relieve the pressure and, conversely, to increase the pressure, compressible solid 73 may be pumped through the valve 109 to raise the pressure. In this manner, the means 80' functions as a means for charging the cylinder 20' with the compressible solid and for adjusting the initial pressure thereof or, optionally, the chamber 20 of the first embodiment, wherein the loading and adjusting means is designated by the numeral 80 but is otherwise identical to the means 80'. A tool T shown in broken lines in FIGURE 10 having a shank engageable with the spherical member 111 or the like, may be used to unseat the spherical member 111 for release of compressible solid 73' as desired to lower the pressure thereof. The pump outlet may include a gauge or pressure regulator not shown to indicate the pressure of the solid 73' for control thereof.

The compressible solid 73' of the second embodiment acts in a manner similar to the compressible solid 73 of the first embodiment, wherein the buff forces are transmitted through the plunger 18' to the compressible solid 73' to dampen the force, after which the compressible solid 73' acts as a spring to return the plunger 18' to its normal position. Conversely, the draft force 40' is translated into movement of the cylinder 19' to the left, relative to the plunger 18', to compress the compressible solid and cause flow thereof through the orifice 49' surrounding the enlarged head of 48' so that the compressible solid 73' again acts as a damping force in one direction and a spring force to return the plunger 18' in its relationship to the cylinder 19'. Dynamic forces are dissipated by the cushioning means 15' in the second embodiment similarly to the cushioning means 15 of the first embodiment.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. A draft gear coupling device for coupling cars of a railway vehicle and cushioning the impact of draft and buff forces, comprising:

coupling means adapted to be secured to one of the cars for detachably connecting said one car to another car, said coupling means being responsive to a buff force between said cars for movement in one direction and to a draft force between said cars for movement in an opposite direction;

cushioning means having a closed chamber of fixed volume and a plunger extending into one end of said chamber and movable relative thereto;

an enlarged head on an inner end of said plunger and movable therewith in said chamber, said head defining an annular orifice between the interior surface of said chamber and the peripheral edge of said enlarged head;

a compressible solid comprising a unitary homogeneous mass under pressure in said chamber surrounding said plunger and said head and filling said chamber for effecting the damping and spring force on said head in response to movement of said plunger into said chamber so as to reduce the volume of the compressible solid in the chamber; and means for translating said movement of said coupling means into an axial movement of one of said plunger and said chamber relative to the other.

2. A draft gear coupling device as defined in claim 1, including means for varying the initial pressure of said compressible solid in said chamber.

3. A draft gear coupling device as defined in claim 1, having an annular seat means in said chamber and spaced inwardly from said one end of said chamber for limiting movement of said head in a direction outwardly of said chamber and having a counterbore defining an annular chamber of reduced diameter adjacent to an outer surface of said head; and retaining means in said chamber immediately adjacent to said one end thereof for retaining said seat member in predetermined spaced relationship to the end of said chamber so as to predetermine the initial volume thereof.

4. A draft gear coupling device as defined in claim 3, including static seal means for sealing said seat means relative to the interior surface of said chamber so as to prevent extrusion of said compressible solid through the annular space between said seat means and said interior of said chamber, said seal means including a plurality of axially spaced annular grooves on the exterior surface of said seat means.

5. A draft gear coupling device as defined in claim 3, including dynamic seal means for sealing said plunger relative to said seat means, said dynamic seal means including means defining an annular chamber surrounding said plunger means and between said seat means and said retaining means and an annular seal rig of compressible, resilient material disposed in said annular chamber.

6. A draft gear coupling device as defined in claim 3, including dynamic seal means for sealing said movable plunger relative to said seat means, said dynamic seal means including:

an annular adapter means surrounding said plunger means and having an enlarged portion slidable in said chamber;

means defining a counterbore in said enlarged portion of said adapter means and adjacent to said seat means so as to define therewith an annular chamber between the bottom annular surface of said counterbore and the outer surface of said plunger; and an annular seal ring of compressible, resilient material located in said annular chamber for sealing said plunger relative to said seat means.

7. A draft gear coupling device as defined in claim 6, wherein said seat means is movable relative to said adapter means so as to decrease said annular chamber in axial dimension in response to an increase of pressure against said seat means and increase in axial dimension in response to a decrease of pressure against said seat means.

8. A draft gear coupling device as defined in claim 6, wherein said seat means is movable relative to said adapter means so as to decrease said annular chamber in axial dimension in response to inward movement of said head relative to said chamber when said head is axially moved in response to a buff or draft force being applied to said plunger means.

9. A combination as defined in claim 2, wherein said charging means includes:

passageway means communicating between the interior and exterior of said chamber and adapted to receive said compressible solid under pressure to flow therethrough so as to fill said chamber; and check valve means in said passageway means, said check valve means including a valve element and a seat, said valve element being unseated from said seat in response to application of said compressible fluid under pressure to flow into said chamber and seatable on said seat to close said passageway by said solid under pressure.

References Cited by the Examiner
UNITED STATES PATENTS

| | | | |
|---|---|---|---|
| 2,029,789 | 2/36 | Parks. | |
| 2,425,364 | 8/47 | Dath | 213—24 |
| 2,427,415 | 9/47 | Olander | 213—24 |
| 2,458,572 | 1/49 | Dentler | 213—24 |
| 2,571,220 | 10/51 | Dentler | 213—32 |
| 2,667,277 | 1/54 | Mulcahy | 213—32 |
| 2,914,196 | 11/59 | Withall | 213—45 |
| 2,994,442 | 8/61 | Frederick | 213—43 |
| 2,994,524 | 8/61 | Jarret et al. | 267—1 |
| 2,997,325 | 8/61 | Peterson | 213—1 |
| 3,053,526 | 9/62 | Kendall | 267—1 |

LEO QUACKENBUSH, *Primary Examiner.*